L. WILLIS.
PLANT SPRAYING MACHINE.
APPLICATION FILED SEPT. 14, 1909.
1,024,239.
Patented Apr. 23, 1912.
3 SHEETS—SHEET 2.
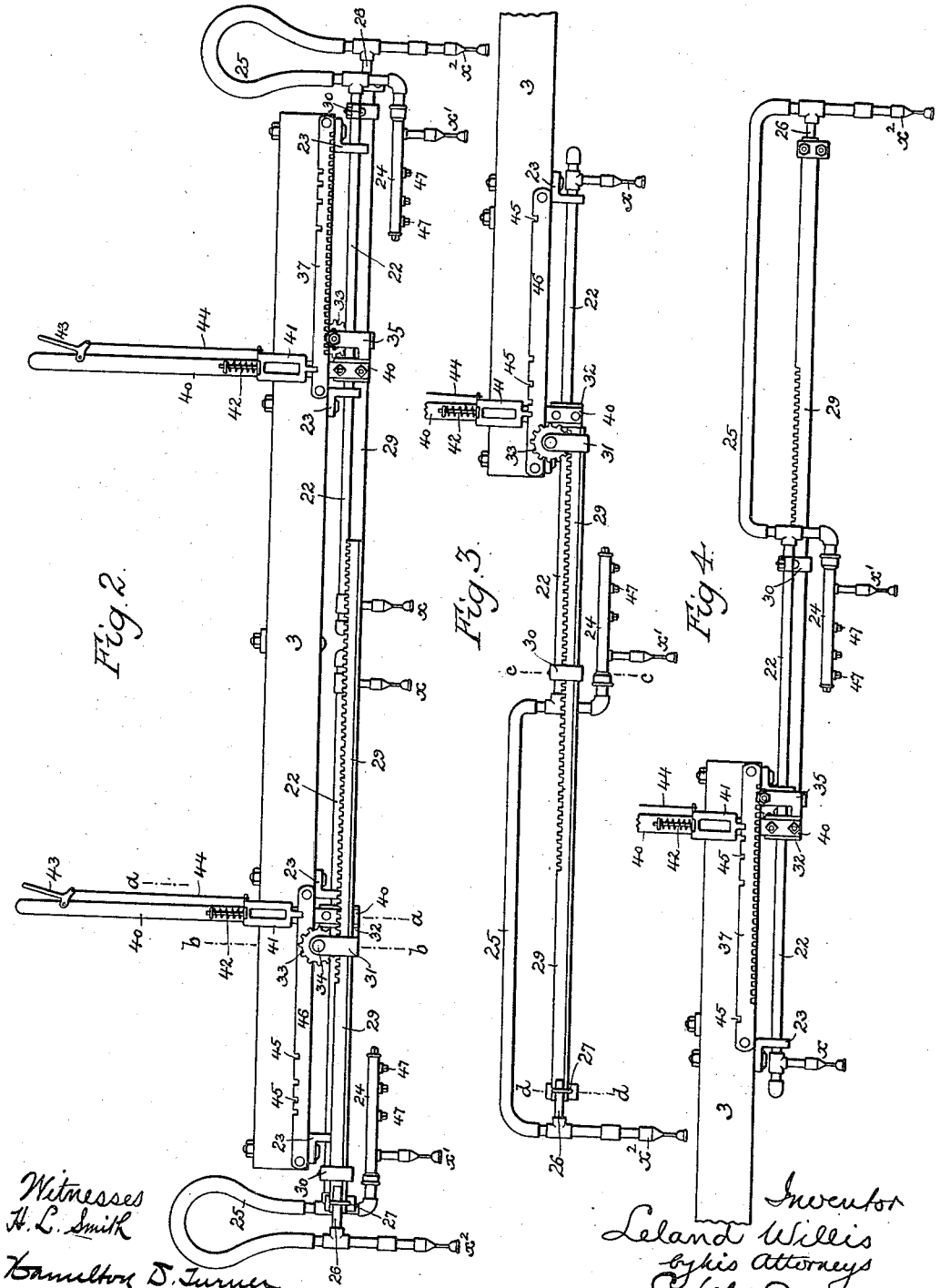

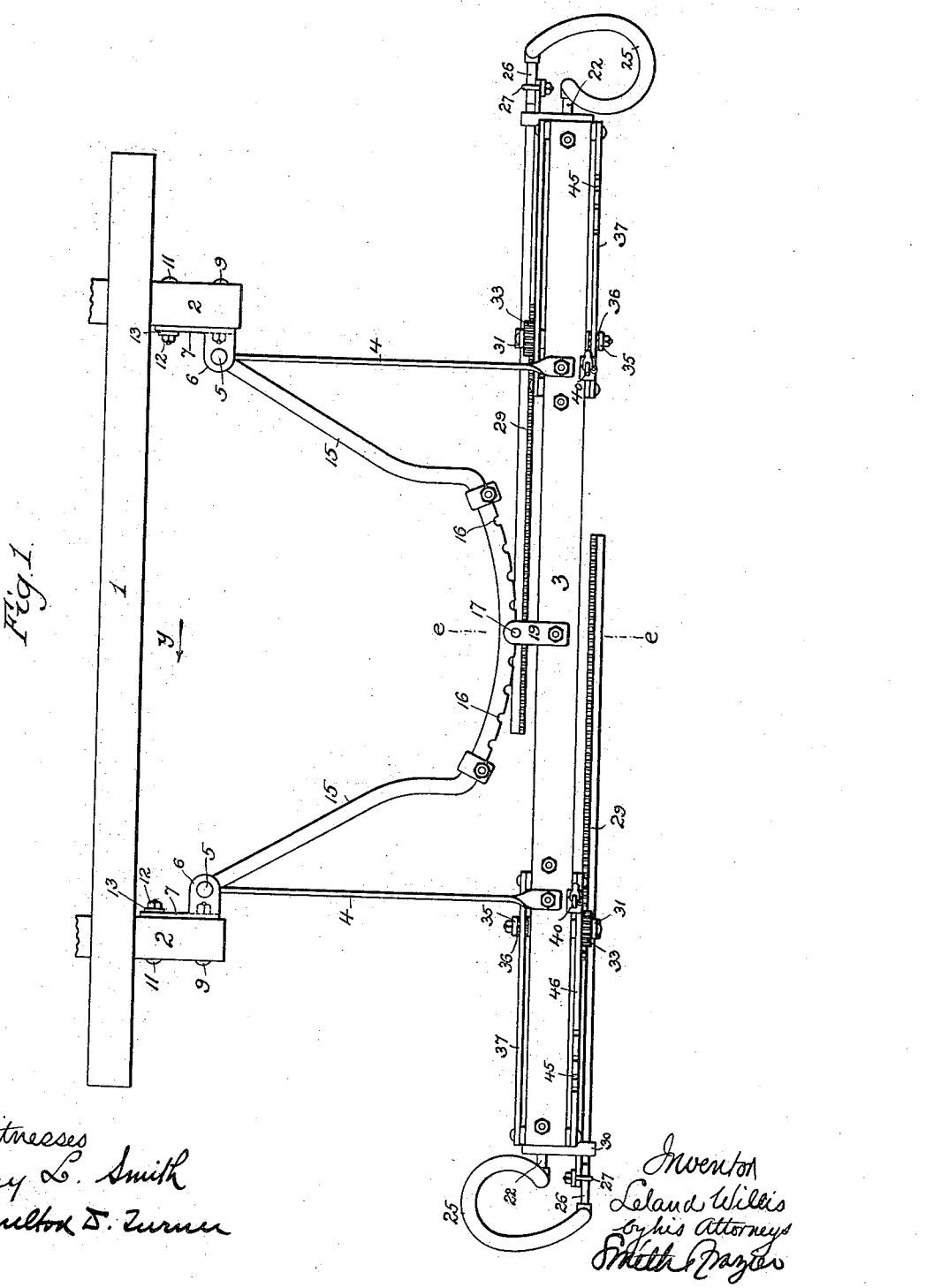

L. WILLIS.
PLANT SPRAYING MACHINE.
APPLICATION FILED SEPT. 14, 1909.
1,024,239.
Patented Apr. 23, 1912.
3 SHEETS—SHEET 3.
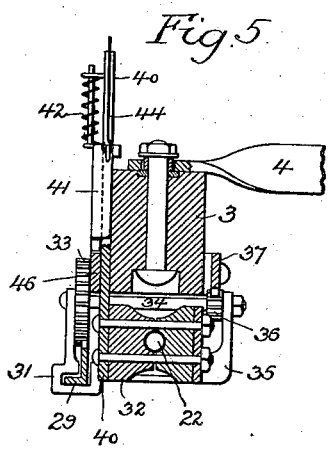
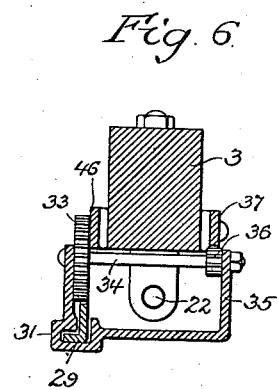
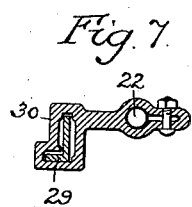
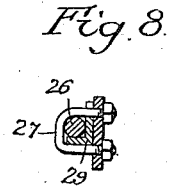
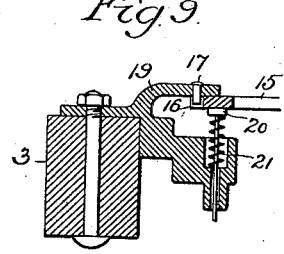
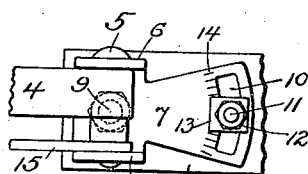
Witnesses
Harry L. Smith
Hamilton D. Turner
Inventor
Leland Willis
by his attorneys
Smith & Dozier

UNITED STATES PATENT OFFICE.

LELAND WILLIS, OF GRENLOCH, NEW JERSEY, ASSIGNOR TO BATEMAN MANUFACTURING COMPANY, OF GRENLOCH, NEW JERSEY, A CORPORATION OF NEW JERSEY.

PLANT-SPRAYING MACHINE.

1,024,239.      Specification of Letters Patent.      Patented Apr. 23, 1912.

Application filed September 14, 1909. Serial No. 517,610.

*To all whom it may concern:*

Be it known that I, LELAND WILLIS, a citizen of the United States, residing in Grenloch, New Jersey, have invented certain Improvements in Plant-Spraying Machines, of which the following is a specification.

The object of my invention is to so construct a plant spraying machine that the same will be available for spraying a plurality of rows of plants on each side of the center of the machine, and particularly for spraying three rows of plants on each side of said center. This object I attain in the manner hereinafter set forth, reference being had to the accompanying drawings, in which—

Figure 1 is a plan view of sufficient of a plant spraying machine to illustrate my invention, the spraying devices being contracted to their fullest extent; Fig. 2 is a front view of the machine with the parts in the same position as in Fig. 1; Fig. 3 is a front view of the spraying devices at one side of the machine illustrating the same in projected position; Fig. 4 is a similar view of the spraying devices at the opposite side of the machine; Fig. 5 is a longitudinal section on the line $a—a$, Fig. 2; Fig. 6 is a longitudinal section on the line $b—b$, Fig. 2; Fig. 7 is a longitudinal section of part of the spraying device on the line $c—c$, Fig. 3; Fig. 8 is a longitudinal section on the line $d—d$, Fig. 3; Fig. 9 is a longitudinal section of part of the machine on the line $e—e$, Fig. 1; Fig. 10 is a side elevation of part of the machine for controlling the lift of the spraying devices, and Fig. 11 is a diagram illustrative of the extent of movement of the different nozzles. Figs. 5 to 10 are on a larger scale than Figs. 1 to 4, and all of the sections are taken as though looking in the direction of the arrow $y$, Fig. 1.

Referring in the first instance to Fig. 1 of the drawings, 1 represents a transverse bar and 2 the forward ends of longitudinal bars constituting part of the fixed structure of the sprayer, this structure being intended to be mounted upon suitable wheels and provided with proper draft mechanism, whereby it can be drawn over the ground in the direction of the rows of plants to be sprayed.

In advance of the fixed structure of the machine is a transverse bar 3 which is mounted so as to be susceptible of both lateral and vertical swinging movement in respect to the fixed frame, a pair of swinging bars 4 being pivotally connected to said bar 3 at their forward ends and each bar being pivotally mounted at its rear end upon a vertical bolt 5 which is carried by lugs 6 projecting from a plate 7, the latter being pivotally mounted by means of a transverse bolt 9 upon one of the longitudinal bars 2 of the fixed frame. The extent of the vertical swinging movement of the bar 3 is determined by a segmental slot 10 in the rear portion of each of the plates 7, this slot receiving a bolt 11 projecting from the bar 2, which bolt carries a nut 12 acting upon a clamp plate 13 bearing upon the face of the plate 7, and adapted to engage with a notched quadrant 14 on said plate so as to lock the latter in any desired position to which it may have been adjusted. Also mounted upon the bolt 5 are the rear ends of the opposite legs of a forwardly projecting yoke 15 having, in its forward connecting member, notches 16 for the reception of a pin 17 depending from a bracket 19 on the bar 3, a plunger 20, acted upon by a coiled lifting spring 21, bearing constantly upon the under side of the yoke 15 so as to maintain the same in engagement with the pin 17, while permitting depression of the forward member of the yoke in order to clear said pin whenever lateral adjustment of the bar 3 becomes necessary, the provision of a plurality of notches 16 in the yoke providing for the locking of the bar 3 in a number of different positions of such lateral adjustment. The construction described permits lateral adjustment of the bar 3 without any interference with its vertical adjustment and vice-versa.

Each end of the bar 3 is provided with a plurality of spraying nozzles, preferably three in number, the innermost nozzle $x$ of the series being carried by the inner portion of a pipe 22 which is mounted so as to be free to slide laterally in brackets 23 depending from the underside of the bar 3, as shown in Figs. 2, 3 and 4, this pipe being provided, at its outer end, with an inwardly projecting branch 24, which carries the intermediate spraying nozzle $x'$. The inner end of each pipe 22 is intended to be connected, by a flexible hose, to the pump or other devices whereby the spraying liquid is supplied under pressure to said pipes 22, and the outer end of each pipe 22 is also connected by a flexible hose 25, to the outermost nozzle $x^2$ of the series. Such outermost nozzle $x^2$ has an inwardly projecting rod 26 which is secured by a clamp 27 (Fig. 8) to the outer end of a bar 29, preferably of angular cross section in order to increase its rigidity. This bar 29 is guided laterally in a loop 30 (Fig. 7) clamped upon the outer portion of the pipe 22, and also in a loop 31 carried by or forming part of a clamp 32 upon the intermediate portion of said pipe 22, as shown in Fig. 5. The upper portion of the vertical flange of the bar 29 is toothed, as shown in Figs. 2, 3 and 4, for engagement with a spur wheel 33 secured to a shaft 34 which extends beneath the bar 3, and is mounted so as to be free to turn in the loop 31 and in a bracket 35 on the opposite side of the clamp 32, as shown in Fig. 5. To the shaft 34 is also secured a spur pinion 36 which meshes with the toothed lower edge of a bar 37 secured to the bar 3 on the side opposite that at which the bar 29 is located, this pinion 36 being of lesser diameter than the spur wheel 33. Secured to and projecting upwardly from the clamp 32 is a handle 40 upon which is mounted a vertical sliding bolt 41, normally depressed by means of a coiled spring 42 but susceptible of being lifted by means of a lever 43 mounted at the upper end of the handle and connected to the bolt 41 by means of a wire or other equivalent connection 44. The bolt 41 normally engages one of a series of notches 45 in a bar 46 secured to the front of the bar 3, or in one of the toothed bars 37. The bars 29 and 37, the spur wheel 33 and the pinion 36 are reversed in respect to one another at the opposite ends of the bar 3 so as to permit of the overlapping of the inner ends of the bars 29 when the same are retracted, as shown in Figs. 1 and 2. When the machine is not in use, the spraying devices occupy this retracted position in order that the machine may readily pass through gateways or doorways of normal size, the inner nozzles $x$—$x$ in such case being relatively close together and the outer nozzles $x^2$ being relatively close to the intermediate nozzles $x'$. When the machine is in use, however, the position of the nozzles in respect to each other must be changed so that said nozzles can spray the evenly spaced rows of plants, the inner nozzles $x$ being separated to the extent necessary to bring them over the rows nearest to the center of the machine, the intermediate nozzles $x'$ bearing the lateral relation to the inner nozzles necessitated by the distance apart of the successive rows so that said intermediate nozzles will operate in conjunction with the intermediate rows of plants, and the outer nozzles $x^2$ having to be separated from the intermediate nozzles $x'$ so as to register with the rows beyond the intermediate rows. The intermediate nozzles $x'$ are adjustable laterally on the inward extensions 24 of the pipes 22 in order that their lateral distance from the inner nozzles $x$ may be varied to accord with the spacing of the rows, said pipe extensions 24 having a series of openings, which, with the exception of that occupied by the nozzle, are normally closed by plugs 47 as shown in Figs. 2, 3 and 4.

The desired projection of the nozzles is effected by outward movement of each pipe 22 through the medium of the clamp 32 and its handle 40, the extent of such outward movement being dependent upon the spacing of the rows of plants and the pipe being locked in position after it has been properly adjusted by engagement of the bolt 41 with the proper notch 45 at the outer end of the bar 46 or bar 37. The pipes 22 are independently adjustable in order that only one of them need be retracted when the machine is turned at the ends of the rows, if the latter happen to extend closely to a fence or other field inclosure.

In order to effect proper separation of the outer nozzles $x^2$ from the intermediate nozzles $x'$ it is necessary that said outer nozzles shall have movement in excess of that imparted to the inner nozzles $x$ and intermediate nozzles $x'$ and this excess movement is effected through the medium of the toothed bars 29 and 37, the shaft 34 and its spur pinion 36 and spur wheel 33. The outer nozzle $x^2$ is projected laterally with the pipe 22 owing to the fact that the nozzle-carrying bar 29 is in mesh with the spur wheel 33 and the latter travels laterally with the pipe 22. At the same time, however, the pinion 36, meshing with the bar 37, is caused to rotate and this rotation is transmitted by the shaft 34 to the spur wheel 33, which is thus caused to project the bar 29 at a rate of speed greater than that at which it is carried laterally by the pipe 22. The necessity for this will be understood on reference to the diagram Fig. 11, in which the dots $w$ represent plants of six parallel and equi-distantly spaced rows, the position of the nozzles when they are contracted being represented in full lines at $x$, $x'$ and $x^2$ and the position of said nozzles when they are projected being represented by dotted lines at $v$, $v'$ and $v^2$.

It will be seen that while the inner and intermediate nozzles $x$ and $x'$ only have to travel the limited distance from $x$ to $v$ and from $x'$ to $v'$, respectively, the outer nozzles $x^2$ have to travel a much greater distance, or from $x^2$ to $v^2$, which represents about three times the extent of movement of the nozzles $x$ and $x'$.

The purpose of the lateral swing of the bar 3 is to compensate for the effect of side winds and to adapt the machine for use in hillside work and the vertical swing of the bar 3 permits proper adjustment of the nozzles in respect to plants of different heights or in different stages of growth.

While I have shown toothed wheels and fixed and movable racks, as a means for effecting differential movement of the inner and outer sprayers, my invention in its broad embodiment is not limited thereto, nor to the specific constructions of parts for effecting the other movements of the spray pipes and nozzles, in fact the outer nozzles may be dispensed with altogether in a machine intended for spraying only four rows, of plants at a time, or when the outer nozzles are used, their supporting bars 29 may be adjusted by hand on the spray pipes 22 before effecting adjustment of the latter, such hand adjustment being governed by the spacing of the rows of plants.

I claim:

1. The combination, in a plant spraying machine, of oppositely disposed spray pipes disposed at a right angle to the line of draft of the machine and each having a plurality of laterally separated spraying nozzles, means for sliding said spray pipes from and toward one another, means for laterally moving the entire group of nozzles while still retaining the spray pipes at a right angle to the line of draft of the machine, and means for locking said last mentioned means in different positions of lateral adjustment.

2. The combination, in a plant spraying machine, of oppositely disposed spray pipes disposed at a right angle to the line of draft of the machine and each carrying a plurality of laterally spaced spraying nozzles, with means for sliding said spray pipes from and toward each other, vertically adjustable means for laterally moving the entire group of nozzles as a unit while still retaining the spray pipes at a right angle to the line of draft of the machine, and means for locking said last mentioned means in different positions of lateral adjustment.

3. The combination, in a plant spraying machine, of a spray pipe having a spraying nozzle thereon, an outer spraying nozzle, means for laterally adjusting said spray pipe, and means whereby said lateral adjustment of the spray pipe is caused to effect lateral adjustment of the outer spraying nozzle independently of the spray pipe.

4. The combination, in a plant spraying machine, of a spray pipe having a plurality of spraying nozzles, laterally separated from one another, an outer spraying nozzle, means for laterally adjusting said spray pipe, and means whereby said lateral adjustment of the spray pipe is caused to effect lateral adjustment of the outer spraying nozzle independently of the spray pipe.

5. The combination, in a plant spraying machine, of a rigid, continuous spray pipe having a plurality of spraying nozzles laterally separated from one another, an outer spraying nozzle independent of the spray pipe, and means for effecting simultaneous lateral movement of said spray pipe and said outer nozzle, the latter to a greater extent than the spray pipe.

6. The combination, in a plant spraying machine, of inner and outer spraying nozzles, a rack carrying said outer nozzle, a fixed rack, and a shaft movable with the inner nozzle, and having pinions engaging said racks.

7. The combination, in a plant spraying machine, of inner and outer spraying nozzles, a rack carrying said outer nozzle, a fixed rack, and a shaft movable with the inner nozzle, and having pinions engaging said racks, one of said pinions being of greater diameter than the other.

8. The combination, in a plant spraying machine, of a spray pipe having spraying nozzles laterally separated from one another, an outer spraying nozzle, a rack carrying the same, a fixed rack, means for laterally adjusting said spray pipe, and a shaft carried by the latter and having pinions meshing with said racks.

9. The combination, in a plant spraying machine, of a spray pipe having spraying nozzles laterally separated from one another, an outer spraying nozzle, a rack carrying the same, a fixed rack, means for laterally adjusting said spray pipe, and a shaft carried by the latter and having pinions meshing with said racks, one of said pinions being of greater diameter than the other.

10. The combination, in a plant spraying machine, of a spray pipe having spraying nozzles laterally separated from one another, an outer spraying nozzle, means for laterally adjusting said spray pipe, means for locking the same in different positions of lateral adjustment in respect to the center of the machine, and means whereby said lateral adjustment of the spray pipe is caused to impart movement to said outer nozzle in excess of the movement of the spray pipe, such excess movement being proportionate to the extent of lateral movement of said spray pipe.

11. The combination, in a plant spraying machine, of a spray pipe having laterally spaced spraying nozzles adjustable laterally from and toward one another, means for laterally adjusting said spray pipe, an outer spraying nozzle, and means whereby said lateral adjustment of the spray pipe is caused to impart lateral movement to the outer spraying nozzle to a greater extent than the lateral adjustment of the spray pipe.

12. The combination, in a plant spraying machine, of a spray pipe having laterally spaced spraying nozzles, adjustable to vary the extent of said lateral spacing, means for laterally adjusting said spray pipe to different distances from the center of the machine, an outer spraying nozzle, and means whereby said lateral adjustment of the spray pipe is caused to impart lateral movement to the outer spraying nozzle to a greater extent than the spray pipe, said excess movement being proportionate to the lateral movement of the pipe.

13. The combination, in a plant spraying machine, of a spray pipe disposed at a right angle to the line of draft of the machine and having a plurality of laterally spaced spray nozzles thereon, a bar carrying said spray pipe, means for laterally moving said bar while retaining the spray pipe at a right angle to the line of draft of the machine and with its nozzles in fixed relation to one another, and means for securing said bar in different positions of lateral adjustment.

14. The combination, in a plant spraying machine, of a spray pipe disposed at a right angle to the line of draft of the machine and having a plurality of spraying nozzles thereon, means for laterally adjusting said spray pipe, a bar carrying said adjusting means, means for laterally moving said bar while still retaining the spray pipe at a right angle to the line of draft of the machine, and means for securing said bar in different positions of lateral adjustment.

15. The combination, in a plant spraying machine, of a bar carrying a spray pipe with a plurality of spraying nozzles thereon, arms on said bar pivoted some distance in the rear of the same, whereby lateral movement can be imparted to the bar, a notched yoke, and a locking device on the bar for engaging said yoke.

16. The combination, in a plant spraying machine, of a bar carrying a spray pipe with a plurality of spraying nozzles thereon, a laterally adjustable support for said bar, a notched yoke, and a locking device on the bar for engaging said yoke, the bar-supporting devices and the yoke being also pivoted so as to be susceptible of vertical movement.

17. The combination, in a plant spraying machine, of a bar carrying a spray pipe with a plurality of spraying nozzles thereon, supporting devices for said bar which permit lateral movement of the same, a locking device on the bar, a yoke engaging the same, a pivoted carrier for said bar-supporting devices and yoke, and means for locking said pivoted carrier in different positions of adjustment.

In testimony whereof, I have signed my name to this specification, in the presence of two subscribing witnesses.

LELAND WILLIS.

Witnesses:
HAMILTON D. TURNER,
KATE A. BEADLE.

---

Copies of this patent may be obtained for five cents each, by addressing the "Commissioner of Patents, Washington, D. C."